United States Patent
Kogtev et al.

(10) Patent No.: US 10,552,266 B1
(45) Date of Patent: Feb. 4, 2020

(54) BACKING UP VIRTUAL DISK CHANGES

(71) Applicant: Acronis International GmBh, Shaffhausen (CH)

(72) Inventors: Dmitri Kogtev, Moscow (RU); Victor Shulga, Moscow (RU); Stanislav Protasov, Moscow (RU); Serguei M. Beloussov, Costa Del Sol (SG); Maxim V. Lyadvinsky, Moscow (RU)

(73) Assignee: ACRONIS INTERNATIONAL GMBH (CH)

( * ) Notice: Subject to any disclaimer, the term of this patent is extended or adjusted under 35 U.S.C. 154(b) by 747 days.

(21) Appl. No.: 14/867,295

(22) Filed: Sep. 28, 2015

Related U.S. Application Data (60) Provisional application No. 62/058,070, filed on Sep. 30, 2014.

(51) Int. Cl.
| | | |
|---|---|---|
| G06F 17/30 | (2006.01) | |
| G06F 11/14 | (2006.01) | |
| G06F 9/455 | (2018.01) | |
| G06F 16/188 | (2019.01) | |

(52) U.S. Cl.
CPC ...... G06F 11/1451 (2013.01); G06F 9/45558 (2013.01); G06F 11/1464 (2013.01); G06F 16/188 (2019.01); G06F 2009/45583 (2013.01); G06F 2201/80 (2013.01)

(58) Field of Classification Search
CPC .......... G06F 11/1451; G06F 11/1464; G06F 9/45558; G06F 16/188; G06F 2201/80; G06F 2009/45583
See application file for complete search history.

(56) References Cited

U.S. PATENT DOCUMENTS

| | | | |
|---|---|---|---|
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,447,854 B1 * | 11/2008 | Cannon | G06F 11/1451 |
| | | | 711/162 |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |

(Continued)

*Primary Examiner* — Debbie M Le
(74) *Attorney, Agent, or Firm* — K&L Gates LLP (57) ABSTRACT

A method, computer program product, computing system, and system for backing up changed sectors of a virtual disk are described. A method may include determining changed file regions of the virtual disk, the changed file regions being file regions of the virtual disk that changed since a last backup. The method may further include determining changed blocks of the virtual disk, the changed blocks of the virtual disk being blocks of the virtual disk that lie, at least in part, in the changed file regions. The method may also include determining changed sectors for the changed blocks of the virtual disk based upon, at least in part, at least one of: a region offset, a block offset, sector size, and a count of sectors in an associated block. Additionally, the method may include backing up the changed sectors of the virtual disk.

15 Claims, 9 Drawing Sheets

(56) References Cited

U.S. PATENT DOCUMENTS

| | | | |
|---|---|---|---|
| 7,779,221 | B1 | 8/2010 | Tormasov et al. |
| 7,831,789 | B1 | 11/2010 | Tsypliaev et al. |
| 7,886,120 | B1 | 2/2011 | Tormasov |
| 7,895,403 | B1 | 2/2011 | Tormasov et al. |
| 7,934,064 | B1 | 4/2011 | Per et al. |
| 7,937,612 | B1 | 5/2011 | Tormasov et al. |
| 7,949,635 | B1 | 5/2011 | Korshunov et al. |
| 7,953,948 | B1 | 5/2011 | Dyatlov et al. |
| 7,979,690 | B1 | 7/2011 | Dyatlov et al. |
| 8,005,797 | B1 | 8/2011 | Chepel et al. |
| 8,051,044 | B1 | 11/2011 | Dyatlov et al. |
| 8,069,320 | B1 | 11/2011 | Per et al. |
| 8,073,815 | B1 | 12/2011 | Korshunov et al. |
| 8,074,035 | B1 | 12/2011 | Per et al. |
| 8,145,607 | B1 | 3/2012 | Korshunov et al. |
| 8,180,984 | B1 | 5/2012 | Per et al. |
| 8,225,133 | B1 | 7/2012 | Tormasov et al. |
| 8,261,035 | B1 | 9/2012 | Tormasov et al. |
| 8,296,264 | B1 | 10/2012 | Dyatlov et al. |
| 8,312,259 | B1 | 11/2012 | Dyatlov et al. |
| 8,347,137 | B1 | 1/2013 | Chepel et al. |
| 8,484,427 | B1 | 7/2013 | Lyadvinsky et al. |
| 8,645,748 | B1 | 2/2014 | Chepel et al. |
| 8,732,121 | B1 | 5/2014 | Zorin et al. |
| 8,856,927 | B1 | 10/2014 | Beloussov et al. |
| 8,996,830 | B1 | 3/2015 | Lyadvinsky et al. |
| 9,152,638 | B1 * | 10/2015 | Naftel ................ G06F 17/3007 |
| 9,372,638 | B1 * | 6/2016 | Sridharan ............... G06F 3/065 |
| 9,720,719 | B2 * | 8/2017 | Graham .............. G06F 9/45558 |
| 10,002,052 | B1 * | 6/2018 | Lyadvinsky ........ G06F 11/1464 |
| 2006/0225065 | A1 | 10/2006 | Chandhok et al. |
| 2010/0011178 | A1 | 1/2010 | Feathergill |

\* cited by examiner

| id | Testcase | build N+1 (time) | build 32669 (time) |
|---|---|---|---|
| 1 | Backup vDisk with single 25 Gb file filled with random data, with CBT. For Incremental, change few bytes in it. Use NO compression. | | 1m 4s |
| 2 | Backup vDisk with single 25 Gb file filled with random data, w/o CBT. For Incremental, change few bytes in it. Use NO compression. | | 8m 28s |
| 3 | Backup vDisk with 25.000 files per 1 Mb each filled with random data, with CBT. For Incremental, change few bytes in 1 file. Use NO compression. | | 0m 38s |
| 4 | Backup vDisk with 25.000 files per 1 Mb each filled with random data, w/o CBT. For Incremental, change few bytes in 1 file. Use NO compression. | | 6m 39s |

FIG. 7A

| id | Testcase | build N+1 (time) | build 41990 (time) |
|---|---|---|---|
| 1 | Backup vDisk with single 25 Gb file filled with random data, with CBT. For Incremental, change few bytes in it. Use NO compression. | | 0m 39s |
| 2 | Backup vDisk with single 25 Gb file filled with random data, w/o CBT. For Incremental, change few bytes in it. Use NO compression. | | 6m 21s |
| 3 | Backup vDisk with 25.000 files per 1 Mb each filled with random data, with CBT. For Incremental, change few bytes in 1 file. Use NO compression. | | 0m 41s |
| 4 | Backup vDisk with 25.000 files per 1 Mb each filled with random data, w/o CBT. For Incremental, change few bytes in 1 file. Use NO compression. | | 6m 17s |

FIG. 7B

BACKING UP VIRTUAL DISK CHANGES

CROSS-REFERENCE TO RELATED APPLICATIONS

This application claims priority to and the benefit of U.S. provisional patent application No. 62/058,070, filed on Sep. 30, 2014, the disclosure of which is herein incorporated by reference in its entirety.

TECHNICAL FIELD

The technical field may generally relate to virtual machine backup, and more particularly to backup of changed data in virtual machines.

BACKGROUND

Various business critical applications may run on virtual machines and thus it may be critical to create backups of such virtual machines in case a failure or loss of data occurs. Backups of virtual machines may be performed often and may consume valuable resources causing the virtual machine to run slower. In some circumstances, it may be necessary to backup only data or sectors which have changed in the virtual machine since a previous backup. Determining the changed data or sectors may require a reading of the entire virtual machine disk, which may be time-consuming.

BRIEF SUMMARY

In an embodiment, a method for backing up changed sectors of a virtual disk may include determining changed file regions of the virtual disk, the changed file regions being file regions of the virtual disk that changed since a last backup. The method may further include determining changed blocks of the virtual disk, the changed blocks of the virtual disk being blocks of the virtual disk that lie, at least in part, in the changed file regions. The method may also include determining changed sectors for the changed blocks of the virtual disk based upon, at least in part, at least one of: a region offset, a block offset, sector size, and a count of sectors in an associated block. Additionally, the method may include backing up the changed sectors of the virtual disk.

One or more of the following features may be included. Determining the changed sectors may include cycling through changed file regions of a virtual disk file associated with the virtual disk and comparing a sector offset with a file region offset and width. The method may further include acquiring a list of the changed file regions from the driver. The method may also include adding the changed sectors to a list of changed sectors. The method may additionally include acquiring a list of virtual disk files corresponding to a base disk and differencing disks.

In an embodiment, a computer program product may reside on a computer readable storage medium and may have a plurality of instructions stored on it. When executed by a processor, the instructions may cause the processor to perform operations for backing up changed sectors of a virtual disk. The operations may include determining changed file regions of the virtual disk, the changed file regions being file regions of the virtual disk that changed since a last backup. The operations may further include determining changed blocks of the virtual disk, the changed blocks of the virtual disk being blocks of the virtual disk that lie, at least in part, in the changed file regions. The operations may also include determining changed sectors for the changed blocks of the virtual disk based upon, at least in part, at least one of: a region offset, a block offset, sector size, and a count of sectors in an associated block. Additionally, the operations may include backing up the changed sectors of the virtual disk.

One or more of the following features may be included. Determining the changed sectors may include cycling through changed file regions of a virtual disk file associated with the virtual disk and comparing a sector offset with a file region offset and width. The operations may further include acquiring a list of the changed file regions from the driver. The operations may also include adding the changed sectors to a list of changed sectors. The operations may additionally include acquiring a list of virtual disk files corresponding to a base disk and differencing disks.

In an embodiment a computing system for backing up changed sectors of a virtual disk may include one or more processors. The one or more processors may be configured to determine changed file regions of the virtual disk, the changed file regions being file regions of the virtual disk that changed since a last backup. The one or more processors may be further configured to determine changed blocks of the virtual disk, the changed blocks of the virtual disk being blocks of the virtual disk that lie, at least in part, in the changed file regions. The one or more processors may also be configured to determine changed sectors for the changed blocks of the virtual disk based upon, at least in part, at least one of: a region offset, a block offset, sector size, and a count of sectors in an associated block. Additionally, the one or more processors may be configured to back up the changed sectors of the virtual disk.

One or more of the following features may be included. Determining the changed sectors may include cycling through changed file regions of a virtual disk file associated with the virtual disk and comparing a sector offset with a file region offset and width. The one or more processors may also be configured to acquire a list of the changed file regions from the driver. The one or more processors may further be configured to add the changed sectors to a list of changed sectors. The one or more processors may additionally be configured to acquire a list of virtual disk files corresponding to a base disk and differencing disks.

In an embodiment, a method for backing up changed sectors of a virtual disk may include acquiring, using at least in part, a file tracker driver running on a computing device, a list of changed file regions for a virtual machine disk. The method may further include determining, using a backup application running on the computing device, for each block of the virtual machine disk, whether at least part of the block lies in a changed file region from the list of changed file regions. The method may also include, in response to determining that at least part of the block lies in a changed file region from the list, calculating, using the backup application running on the computing device, a set of changed sectors for the block. The method may additionally include adding, using the backup application running on the computing device, the set of changed sectors to a list of changed sectors. Moreover, the method may include backing up, using the backup application running at the computing device, the changed sectors of the virtual disk.

In an embodiment, a system for backing up changed sectors of a virtual disk may include a virtual machine operating system that manages a virtual machine. The system may further include a file tracking driver that detects changes on a virtual machine disk associated with the virtual machine. The system may also include a virtual machine disk file that includes data associated with the virtual machine disk. The system may additionally include a record of changed file regions in the virtual machine disk file, the changed file regions being file regions in the virtual machine disk file that changed since a last backup. Moreover, the system may include a block allocation table that translates a virtual machine disk offset of the virtual machine disk to a virtual machine disk file offset of the virtual machine disk file, the block allocation table including one or more records that reference one or more blocks of the virtual machine disk with data and metadata associated with the block.

The details of one or more implementations are set forth in the accompanying drawings and the description below. Other features and advantages will become apparent from the description, the drawings, and the claims.

DETAILED DESCRIPTION

Overview

A cloud provider may institute backup and recovery procedures to ensure persistence of a tenant's applications, data, or other resources accessed through one or more virtual machines ("VM"). For example, a backup archive of the VM may be created and stored onsite or offsite and may include the entire content of the VM before it failed. Efficient backup and recovery of VMs may be critical for proper business operations of the cloud provider as the tenant's application demands are likely to continue in the event of a VM failure.

In order to back up only the changed data (i.e., data changed since a previous backup) for a virtual machine (e.g., a Hyper-V virtual machine), it may be necessary to read the entire virtual machine disk to identify which data or specific sectors have changed. Reading the entire virtual machine disk and calculating which data has changed may be a time-consuming operation. This type of time consuming operation may slow down the backup process for virtual machine backup. Thus, it may be desirable to have a method for identifying changed data more efficiently.

While it may be possible to speedup the backup process using high performance drives (e.g., solid state drives), such drives me be expensive and cost prohibitive. Even when using high performance drives, without using information about changed sectors, the backup process may be significantly slower than necessary.

As will be described in the present disclosure, a driver may be used to track changes in the virtual disk file and translate them to a list of changed sectors on the virtual disks. A backup application may then backup only changed sectors of the virtual disks. By identifying changed sectors without reading the entire virtual disk and then backing up only the changed sectors, the backup process may become more efficient.

To back up only changed sectors of a virtual disk, one or more operations may be performed. For example, a driver (e.g., a file tracker driver) may begin tracking changes in the virtual disk file corresponding to the virtual disk. On a next backup, the system may receive changes in the sectors of the virtual disk blocks. For changed file regions received from the driver, the system may identify sectors that lie in the changed file regions by cycling through all the changed file regions and mapping the file region offset and length into disk sector sequences or ranges.

Figure 1:
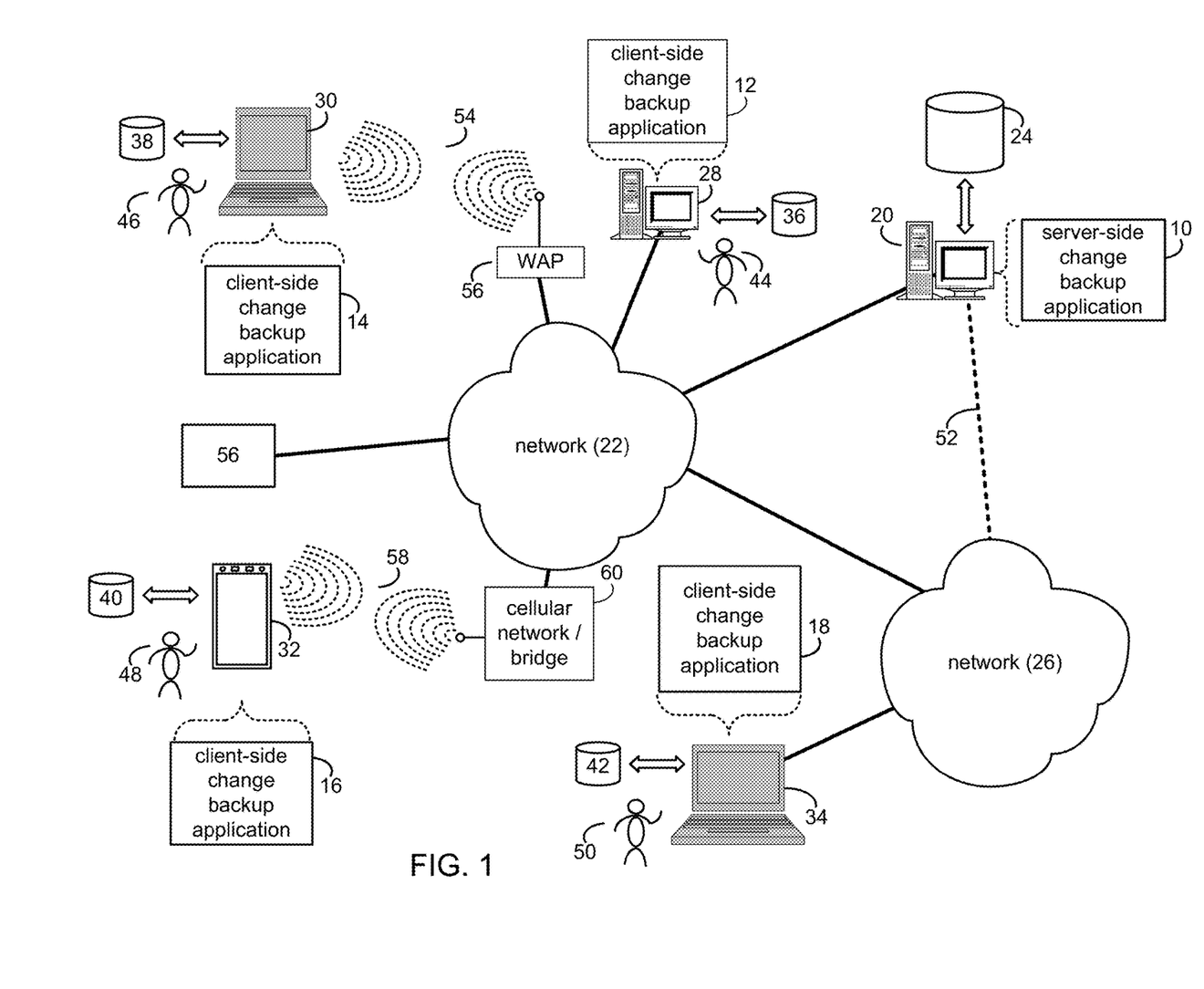
FIG. 1 depicts an example system that can execute implementations of the present disclosure.
Figure 2:
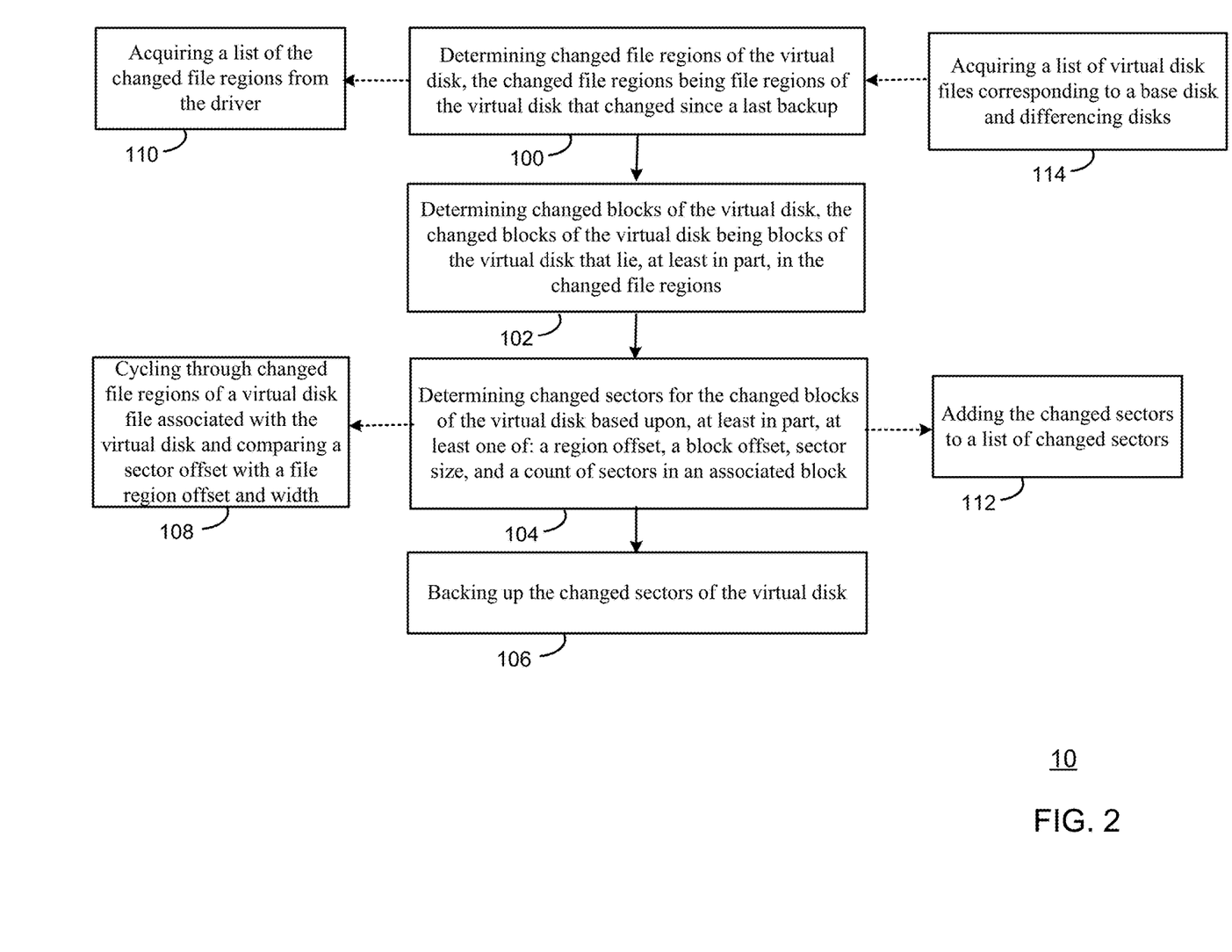
FIG. 2 is a flowchart illustrating an example process for backing up virtual disk changes in accordance with the present disclosure.

Referring to FIGS. 1 & 2, there is shown a server-side change backup application 10 and client-side change backup applications 12, 14, 16, and 18. Server-side change backup application 10 and/or one or more of client-side change backup applications 12, 14, 16, and/or 18 may execute one or more processes configured to carry out one or more of the features described herein. Server-side change backup application 10 may be referred to as a process configured to carry out one or more of the features described herein, such as change backup process 10. Further, one or more of client-side change backup applications 12, 14, 16, and 18 may be referred to as a process configured to carry out one or more of the features described herein, such as change backup processes 12, 14, 16, and/or 18.

As will be discussed below, change backup process 10 may determine 100, using a driver running at a computing device, changed file regions of the virtual disk, the changed file regions being file regions of the virtual disk that changed since a last backup. Change backup process 10 may also determine 102, using a backup application running at the computing device, changed blocks of the virtual disk, the changed blocks of the virtual disk being blocks of the virtual disk that lie, at least in part, in the changed file regions. Change backup process 10 may further determine 104, using the backup application running at the computing device, changed sectors for the changed blocks of the virtual disk based upon, at least in part, at least one of: a region offset, a block offset, sector size, and a count of sectors in an associated block. Change backup process 10 may also backup 106, using the backup application running at the computing device, changed sectors for the changed blocks of the virtual disk based upon, at least in part, at least one of: a region offset, a block offset, sector size, and a count of sectors in an associated block.

The change backup process may be a server-side process (e.g., server-side change backup process 10), a client-side process (e.g., client-side change backup process 12, client-side change backup process 14, client-side change backup process 16, or client-side change backup process 18), or a hybrid server-side/client-side process (e.g., a combination of server-side change backup process 10 and one or more of client-side change backup processes 12, 14, 16, 18).

System Overview

Referring to FIG. 1, server-side change backup process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side change backup process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side change backup processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side change backup processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side change backup processes 12, 14, 16, 18 and/or server-side change backup process 10 may be processes that run within (i.e., are part of) a cloud computing site, cloud computing application, cloud platform, or cloud environment. Alternatively, client-side change backup processes 12, 14, 16, 18 and/or server-side change backup process 10 may be stand-alone applications that work in conjunction with the cloud computing site, cloud computing application, cloud platform, or cloud environment. One or more of client-side change backup processes 12, 14, 16, 18 and server-side change backup process 10 may interface with each other (via network 22 and/or network 26).

Users 44, 46, 48, 50 may access server-side change backup process 10 directly through the device on which the client-side change backup process (e.g., client-side change backup processes 12, 14, 16, 18) is executed, namely client electronic devices 28, 30, 32, 34, for example. Users 44, 46, 48, 50 may access server-side change backup process 10 directly through network 22 and/or through secondary network 26. Further, server computer 20 (i.e., the computer that executes server-side change backup process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Change Backup Process

For the following discussion, server-side change backup process 10 will be described for illustrative purposes. It should be noted that server-side change backup process 10 may interact with client-side change backup process 12 and may be executed within one or more applications that allow for communication with client-side change backup process 12. However, this is not intended to be a limitation of this disclosure, as other configurations are possible (e.g., stand-alone, client-side change backup processes and/or stand-alone server-side change backup processes). For example, some implementations may include one or more of client-side change backup processes 12, 14, 16, 18 in place of or in addition to server-side change backup process 10.

The systems and methods (e.g., change backup process 10) described herein relate to the backup of data in a virtualized environment. In part, the systems and methods relate to decreasing the time required to detect changes in a virtual machine disk. The techniques and features described herein may reduce the backup time period for the VM.

The systems described herein may include one or more memory elements for backup of software and databases, virtual machines, and computer storage products including instructions to be executed by a processor to cause the processor to implement the methods described herein. The systems described herein may also include a backup archive, where the VM backup file, backup archive file, or backup contents may be located; the backup archive may be disposed in a memory, a portion of a memory, or across one or more memories.

Referring now to FIG. 1, one or more of users 44, 46, 48, and 50 may be cloud administrators at a cloud provider or may be cloud end-users. The cloud administrators may access and administer cloud a computing site and the cloud-end users may access and interact with the cloud computing site through one or more of client electronic devices 28, 30, 32, 34 (respectively). The cloud computing site may run a cloud or virtualization application such as VMWare™ or may include bare-metal embedded hypervisors (e.g., VMware™ ESX™ and VMware™ ESXi™) that may run directly on server hardware at cloud computing site 20. Further, the cloud computing site may include a vCloud™ architecture that may enhance cooperation between hypervisors.

Figure 4:
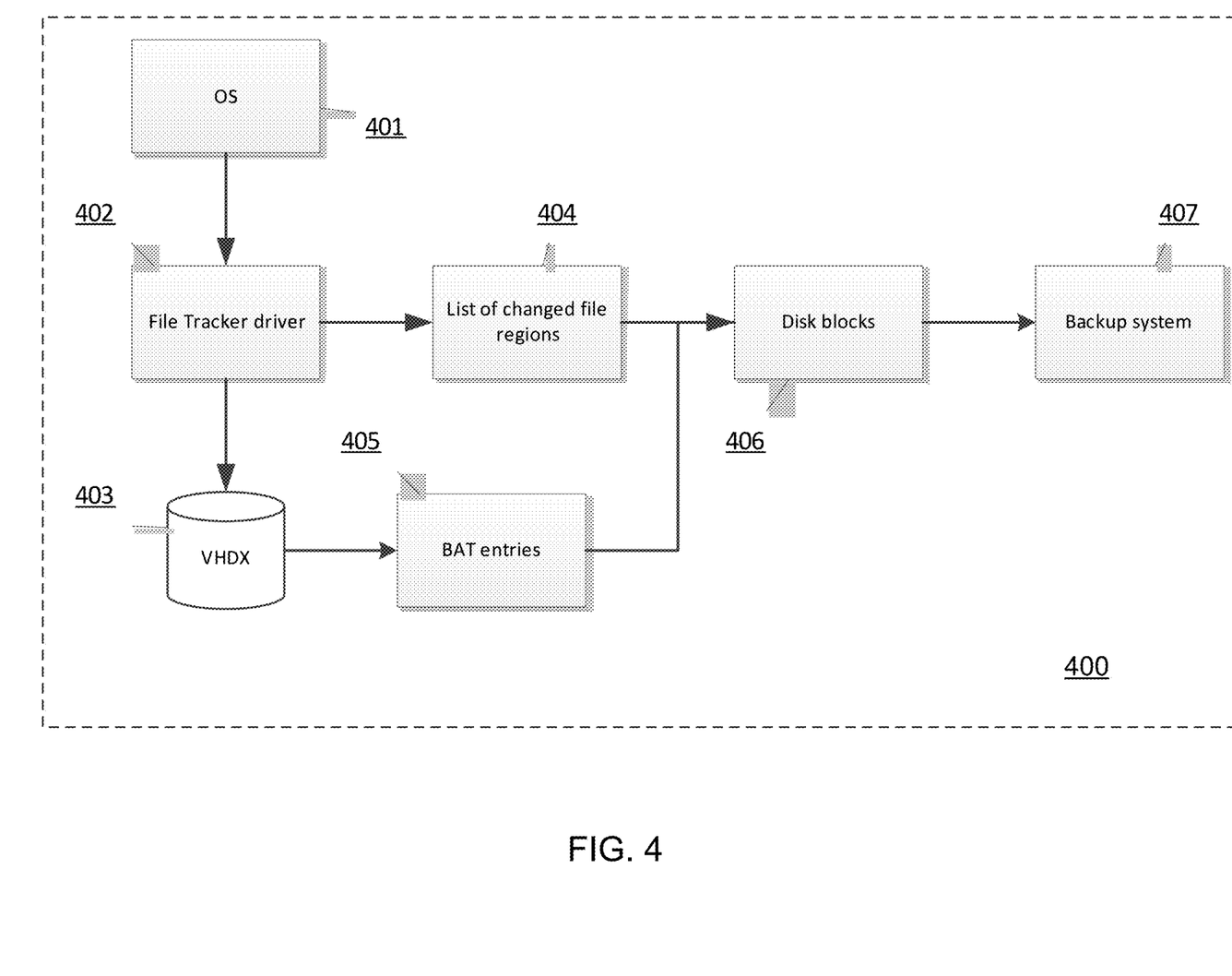
FIG. 4 also depicts an example system that can execute implementations of the present disclosure.

Referring now to FIG. 4, the cloud computing site may include one or more virtualization host machines such as virtualization host 400 (e.g., a virtual machine host computer). Virtualization host 400 may be a server computer on which a hypervisor runs one or more virtual machines. Virtualization host 400 may be an ESXi host and may run the VMware™ ESXi™ hypervisor. Virtualization host 400 may use a cluster file system such as Virtual Machine File System (VMFS) or a Network File System (NFS). It should be noted that while multiple elements are shown in side virtualization host 400 in FIG. 4, this is for illustrative purposes only and one or more of the elements shown in FIG. 4 may be located outside virtualization host 400 in various implementations.

For example, virtualization host 400 may include operating system 401, which may be a hypervisor that manages virtual machines. Virtualization host 400 may also include file tracking driver 402, which may be a driver that detects and collects changes on a file system of the operating system on which the hypervisor is running. Further, virtualization host 400 may include virtual hard disk file 403, which may be a file that includes the virtual disk data. Additionally a list of changed file regions 404 may be a list of changed regions in the virtual hard disk file. This list may be collected and provided upon request by the driver (e.g., file tracking driver 402) that detects changes on the file system of the operating system. Moreover, a block allocation table (BAT) 405 may be a redirection table used to translate a virtual hard disk offset to a virtual hard disk file offset. BAT 405 may be an object of the virtual hard disk file. BAT 405 may describe the placement of data blocks in the virtual hard disk file corresponding to ranges of virtual disk logical sectors. BAT 405 may provide information on blocks of sectors that do not contain payload (i.e., unallocated blocks), and on zeroed blocks of sectors. Entries of BAT 405 may be records in the BAT that include reference to a block with data and meta information about block (e.g. block is zeroed). Virtualization host 400 may additionally include disk blocks 406, and each disk block may include a contiguous sequence of virtual disk sectors.

Figure 3A:
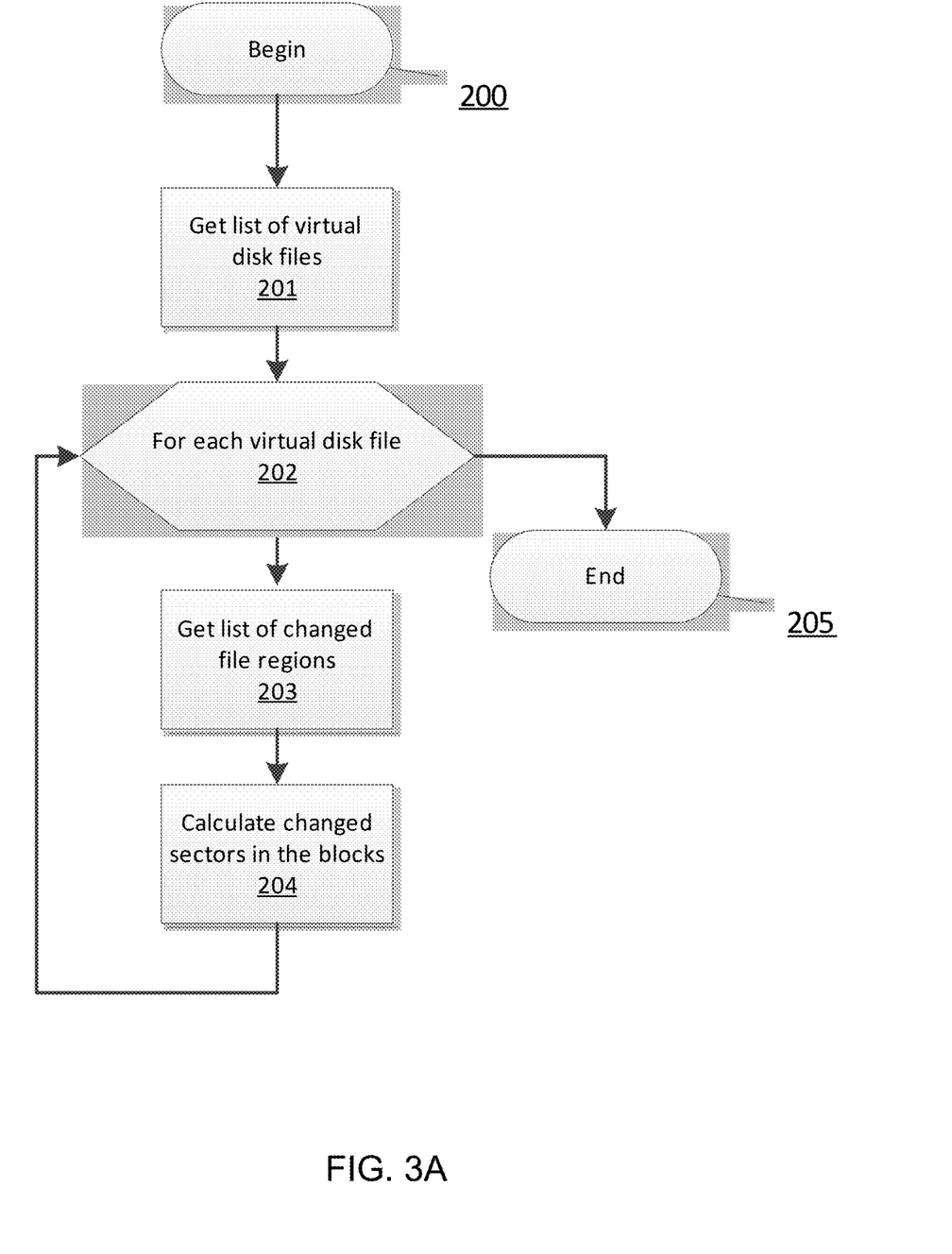
FIG. 3A is also flowchart illustrating an example process for backing up virtual disk changes in accordance with the present disclosure.
Figure 5:
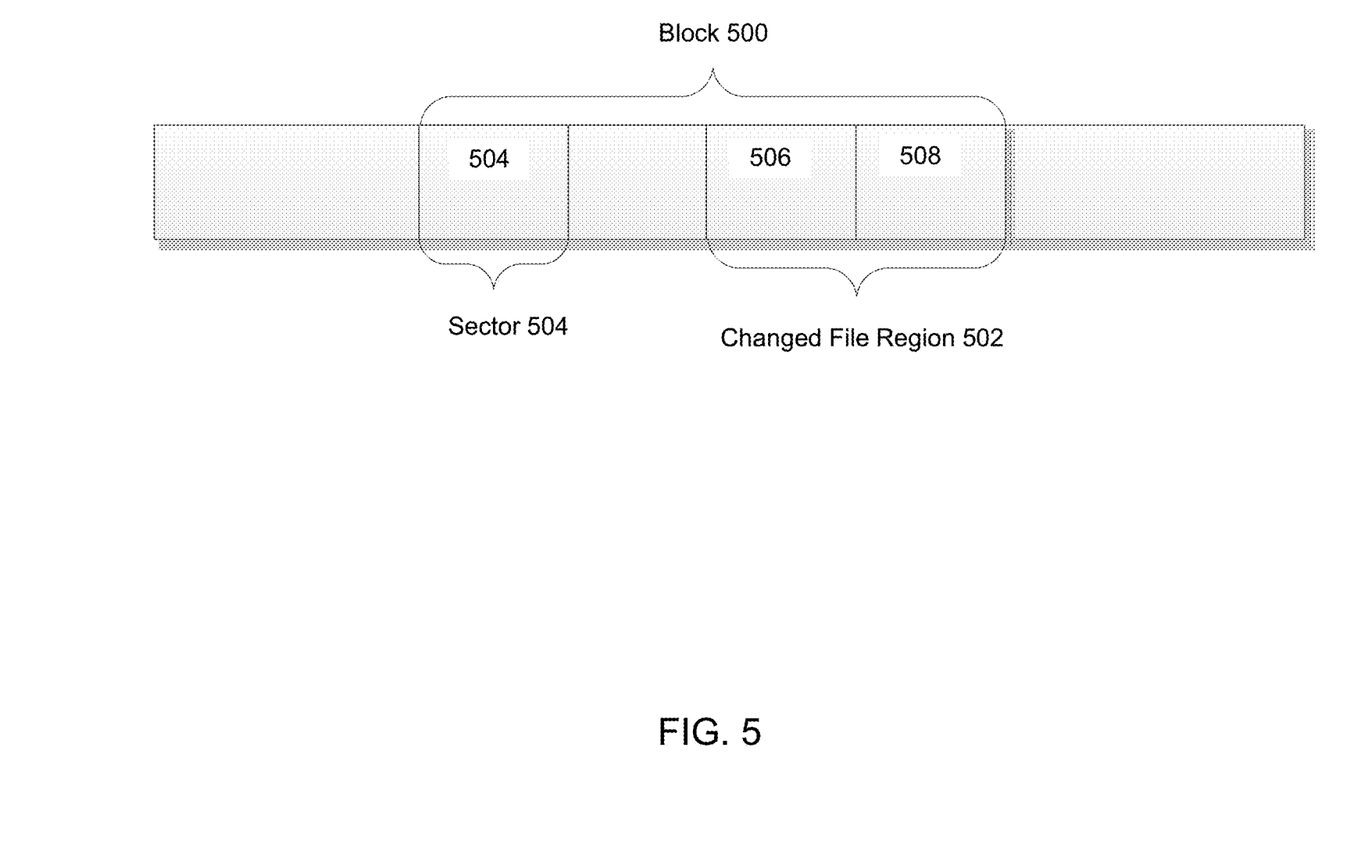
FIG. 5 depicts an example virtual disk block structure.

Referring now also to FIG. 2 and FIG. 3A, in an implementation, change backup process 10 acquire 114 (201) a list of virtual disk files corresponding to a base disk and differencing disks. Change backup process 10 may further determine 100, using a driver (e.g., file tracker driver 402) running at a computing device (e.g., virtualization host 400), changed file regions of the virtual disk. Referring now also to FIG. 5, the changed file regions (e.g., changed file region 502) may be file regions of the virtual disk that changed since a last backup. The virtual disk data associated with the virtual disk may be stored in virtual hard disk file 403. In an implementation, for each virtual disk file (202), change backup process 10 may acquire 110 (203) a list of the changed file regions (e.g., list of the changed file regions 404) from the driver (e.g., file tracker driver 402).

Further change backup process 10 may determine 102, using a backup application running at the computing device (e.g., virtualization host 400), changed blocks of the virtual disk. The changed blocks (e.g. block 500) of the virtual disk may be blocks of the virtual disk that lie, at least in part, in the changed file regions (e.g., changed file region 502). Change backup process 10 may be part of the backup application running at the computing device (e.g., virtualization host 400). For example, backup system 407 may include one or more of the backup application and change backup process 10. In an implementation, virtualization host 400 and server computer 20 are the same computing device.

Change backup process 10 may determine 104, using the backup application running at the computing device (e.g., virtualization host 400), changed sectors (e.g., changed sectors 506, 508) for the changed blocks (e.g. block 500) of the virtual disk. Change backup process 10 may determine the changed sectors based upon, at least in part, at least one of: a region offset, a block offset, sector size, and a count of sectors in an associated block. In an implementation, change backup process 10 may calculate (204) changed sectors (e.g., changed sectors 506, 508) in the blocks (e.g., block 500). Further, in an implementation, change backup process 10 may add the changed sectors (e.g., changed sectors 506, 508) to a list of changed sectors.

Figure 3B:
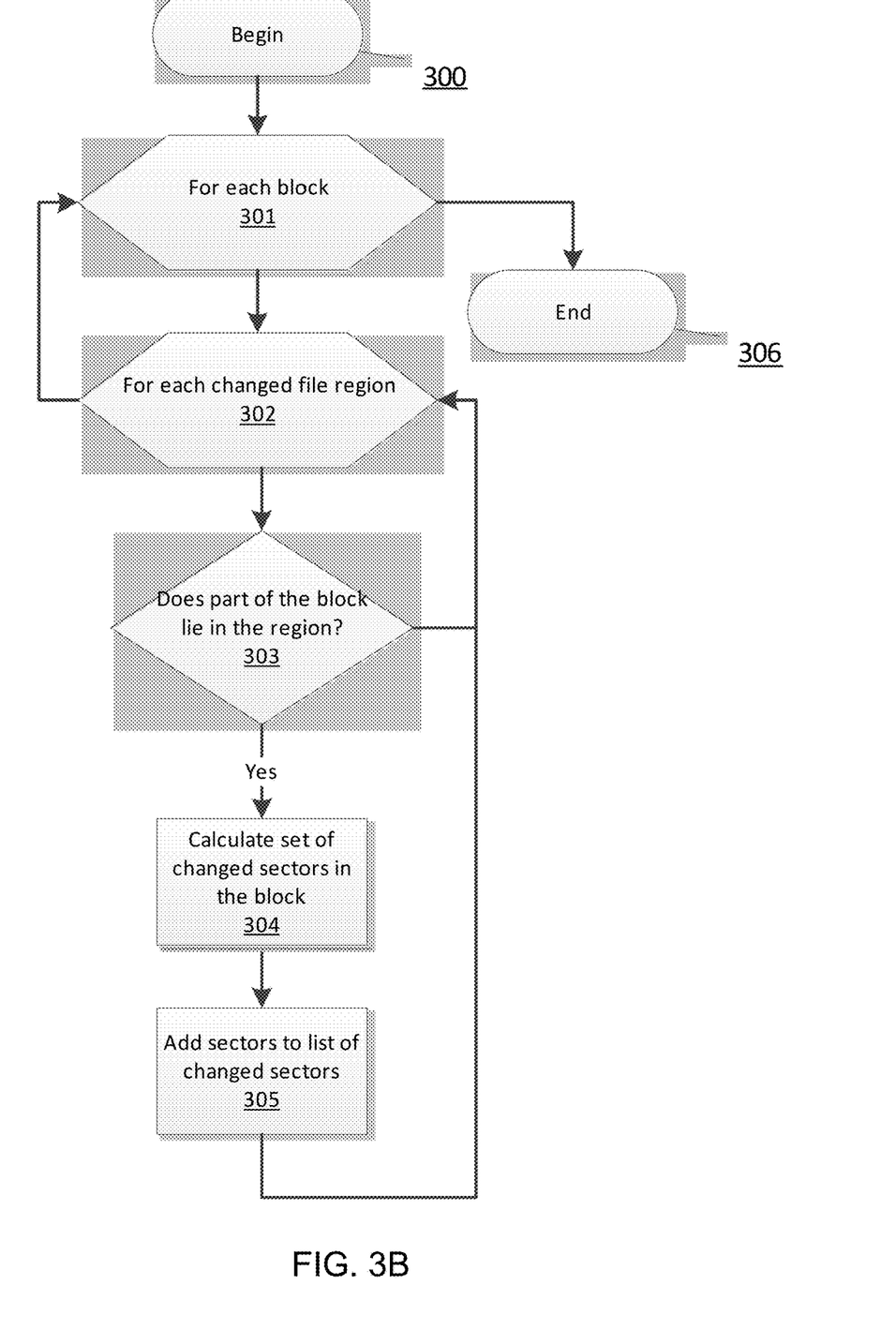
FIG. 3B is also flowchart illustrating an example process for backing up virtual disk changes in accordance with the present disclosure.

In this way, change backup process 10 may cycle 108 through changed file regions (e.g., changed file region 502) of a virtual disk file (e.g., virtual hard disk file 403) associated with the virtual disk and compare a sector offset with a file region offset and width. Referring now also to FIG. 3B, for each block (301) (e.g., block 500), and for each changed file region (302) (e.g., changed file region 502), change backup process 10 may determine whether at least part of the block (e.g., block 500) lies (303) in the changed filed region (changed file region 502).

For example, change backup process 10 may look in the BAT to find which data block(s) of a file may intersects a given (changed) file region. If there is one or several such blocks, then for each block, the changed sectors may calculated. The calculation may be based upon a BAT entry index for the particular data block. The BAT entry index may produce a disk sector offset for the particular block. Locating the intersection of the data block with the given file region, change backup process 10 may calculate a relative disk sector offset and a number of disk sectors (contiguous) inside the data block. Adding the disk sector offset for the particular block to the relative disk sector offset may yield an absolute disk sector offset for the changed area inside the particular data block. Thus, an absolute contiguous sequence of changed sectors for the particular data block may be determined.

In this way, change backup process 10 may calculate (304) a set of changed sectors (e.g., changed sectors 506, 508) in the block (e.g., block 500). Further, change backup process 10 may add (305) the changed sectors (e.g., changed sectors 506, 508) or changed sector range to the list of changed sectors. Additionally, change backup process 10 may back up 106, using the backup application running at the computing device (e.g., virtualization host 400), the changed sectors (e.g., changed sectors 506, 508) of the virtual disk.

It should be noted that change backup process may perform some, or all, or the operations described herein in various embodiments and implementations, as may be necessary. For example, and referring not also to FIG. 6, in an embodiment, change backup process 10 may acquire 600, using at least in part, a file tracker driver (e.g., file tracker driver 402) running on a computing device (e.g., virtualization host 400), a list of changed file regions (e.g., list of changed file regions 404) for a virtual machine disk. Further, change backup process 10 may determine 602, using a backup application running on the computing device (e.g., virtualization host 400), for each block (e.g., block 500) of the virtual machine disk, whether at least part of the block lies in a changed file region from the list of changed file regions (e.g., list of changed file regions 404).

Figure 6:
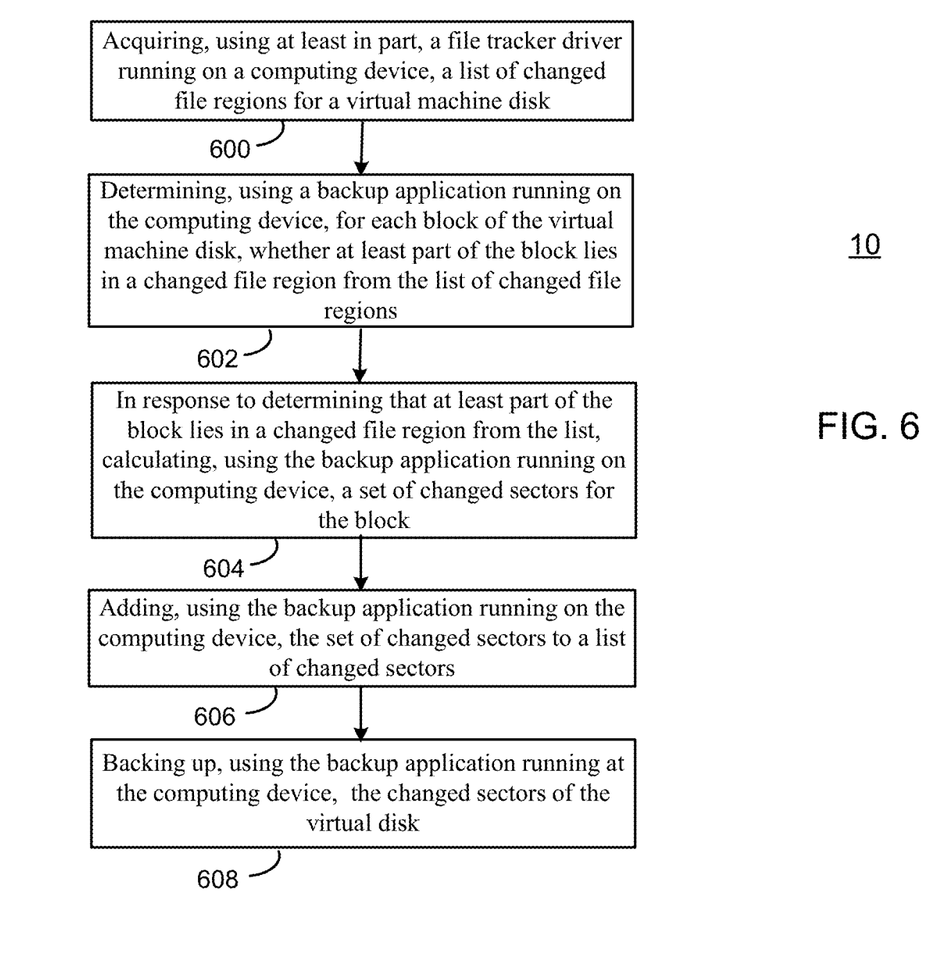
FIG. 6 is also a flowchart illustrating an example process for backing up virtual disk changes in accordance with the present disclosure.

Additionally, in response to determining that at least part of the block (e.g., block 500) lies in a changed file region from the list, change backup process 10 may calculate 604, using the backup application running on the computing device (e.g., virtualization host 400), a set of changed sectors (e.g., changed sectors 506, 508) for the block (e.g., block 500). Further, change backup process 10 may add 606, using the backup application running on the computing device (e.g., virtualization host 400), the set of changed sectors to a list of changed sectors. Change backup process 10 may also back up 608, using the backup application running at the computing device (e.g., virtualization host 400), the changed sectors of the virtual disk.

In an implementation, if a backup fails, the next backup may be performed without using the change backup process (changed block tracking). The following backup may then be performed using the change backup process (changed block tracking). Further, during a backup process, events may be written in a log. For example, the status of the change backup process or changed block tracking (CBT) feature (whether enabled or disabled) may be written. Further, an exception that a whole file must be read (e.g., because the driver is unable to track changes of this particular file) may be written. In an implementation, a sector by sector backup may be possible while using the change backup process or changed block tracking (CBT) feature (i.e., if the feature is enabled). Further, in an implementation, a sector by sector mode may be enabled automatically.

Figure 7A:
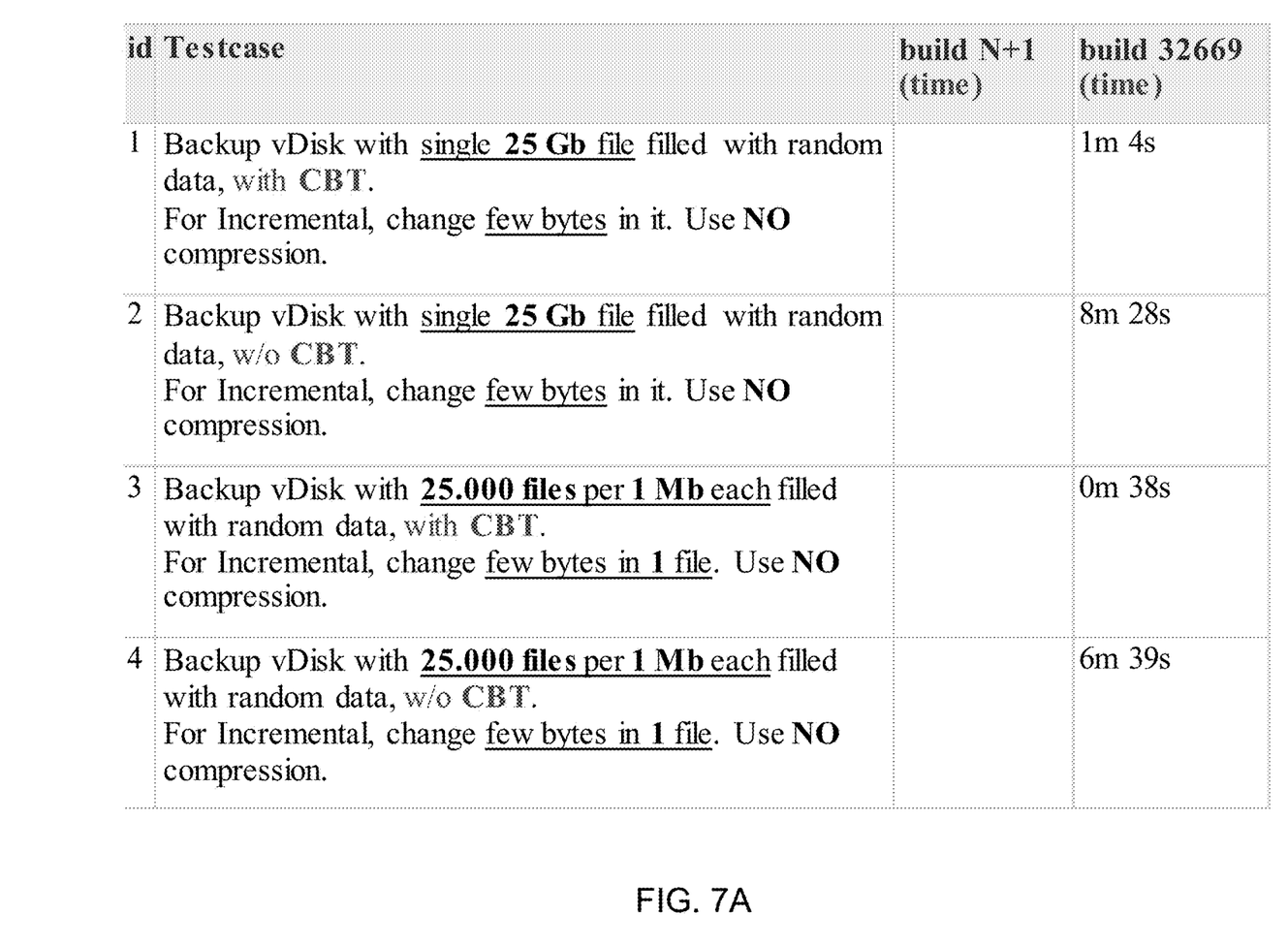
FIG. 7A is chart showing an example test case related to the techniques and features of the present disclosure, and efficiencies that may be gained therefrom.
Figure 7B:
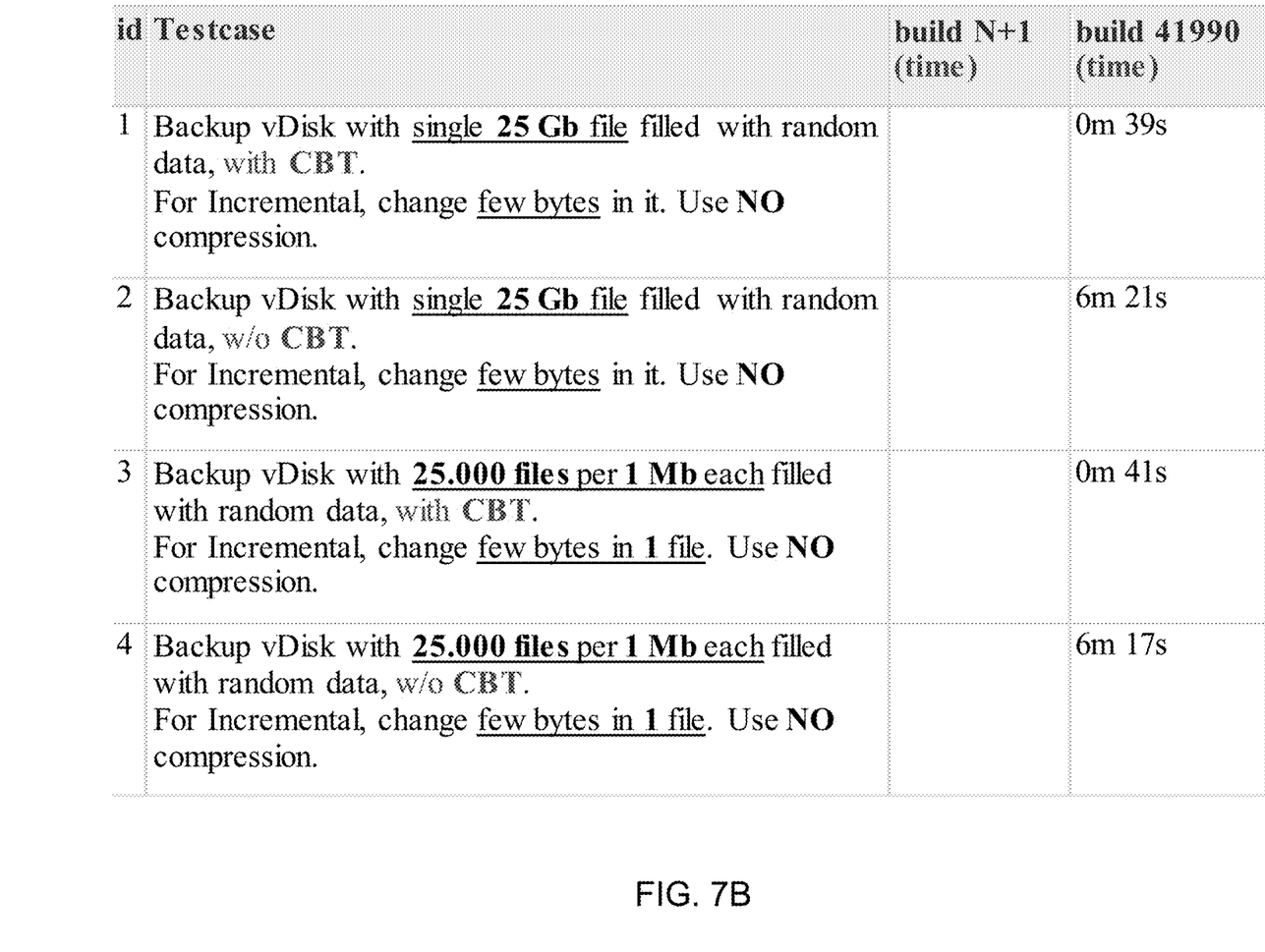
FIG. 7B is chart showing an example test case related to the techniques and features of the present disclosure, and efficiencies that may be gained therefrom.

Referring now also to FIG. 7A and FIG. 7B, test cases which may show efficiencies that may be gained using the techniques and features of the present disclosure (e.g., change backup process/changed block technology (CBT)) are shown. FIG. 7A and FIG. 7B show performance cases which compare the backup speed between CBT and non-CBT incremental backup. It should be noted that the charts provided in FIGS. 7A and 7B are provided for illustrative purposes only and are not intended to limit the scope of the present disclosure. The charts provided in FIGS. 7A and 7B may show the results of comparative performance tests with and without using the technology described in the present disclosure. The charts show a difference in time required for backup of changed data on a system under test.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for backing up changed sectors of a virtual disk, the method comprising:
   determining changed file regions of the virtual disk using a file tracker driver, the changed file regions being file regions of the virtual disk that changed since a last backup;
   determining changed blocks of the virtual disk, the changed blocks of the virtual disk being blocks of the virtual disk that lie, at least in part, in the changed file regions;
   determining changed sectors for the changed blocks of the virtual disk based upon by cycling through all the changed file regions determined using the file tracker driver and mapping the file region offset and length into disk sector sequences; and
   backing up the changed sectors of the virtual disk.

2. The method of claim 1, further comprising:
   acquiring a list of the changed file regions from the driver.

3. The method of claim 1, further comprising:
   adding the changed sectors to a list of changed sectors.

4. The method of claim 1, further comprising:
acquiring a list of virtual disk files corresponding to a base disk and differencing disks.

5. A computer program product residing on a computer readable storage medium having a plurality of instructions stored thereon, which, when executed by a processor, cause the processor to perform operations for backing up changed sectors of a virtual disk, the operations comprising:
determining changed file regions of the virtual disk, the changed file regions being file regions of the virtual disk that changed since a last backup;
determining changed blocks of the virtual disk, the changed blocks of the virtual disk being blocks of the virtual disk that lie, at least in part, in the changed file regions;
determining changed sectors for the changed blocks of the virtual disk based upon, at least in part, at least one of: a region offset, and a block offset in an associated block;
cycling through changed file regions of a virtual disk file associated with the virtual disk;
comparing a sector offset with a file region offset and width; and
backing up the changed sectors of the virtual disk.

6. The computer program product of claim 5, wherein the operations further comprise:
acquiring a list of the changed file regions from the driver.

7. The computer program product of claim 5, wherein the operations further comprise:
adding the changed sectors to a list of changed sectors.

8. The computer program product of claim 5, wherein the operations further comprise:
acquiring a list of virtual disk files corresponding to a base disk and differencing disks.

9. A computing system for backing up changed sectors of a virtual disk, the computing system comprising one or more processors, wherein the one or more processors are configured to:
determine changed file regions of the virtual disk, using a file tracker driver, the changed file regions being file regions of the virtual disk that changed since a last backup;
determine changed blocks of the virtual disk, the changed blocks of the virtual disk being blocks of the virtual disk that lie, at least in part, in the changed file regions;
locate intersection of data block with a given file region;
calculate a disk sector offset and a number of contiguous disk sectors inside the data block;
determine changed sectors for the changed blocks of the virtual disk based upon, at least in part, at least one of: a region offset, a block offset, sector size, and a count of sectors in an associated block; and
back up the changed sectors of the virtual disk.

10. The computing system of claim 9, wherein determining the changed sectors further comprises:
cycling through changed file regions of a virtual disk file associated with the virtual disk and comparing a sector offset with a file region offset and width.

11. The computing system of claim 9, wherein the one or more processors are further configured to:
acquire a list of the changed file regions from the driver.

12. The computing system of claim 9, wherein the one or more processors are further configured to:
adding the changed sectors to a list of changed sectors.

13. The computing system of claim 9, wherein the one or more processors are further configured to:
acquiring a list of virtual disk files corresponding to a base disk and differencing disks.

14. A method for backing up changed sectors of a virtual disk, the method comprising:
acquiring, using at least in part, a file tracker driver running on a computing device, a list of changed file regions for a virtual machine disk;
determining, using a backup application running on the computing device, for each block of the virtual machine disk, whether at least part of the block lies in a changed file region from the list of changed file regions;
accessing a block allocation table to find which data blocks of a file intersects a given changed file region;
in response to determining that at least part of the block lies in a changed file region from the list, calculating, using the backup application running on the computing device, a set of changed sectors for the block;
adding, using the backup application running on the computing device, the set of changed sectors to a list of changed sectors; and
backing up, using the backup application running at the computing device, the changed sectors of the virtual disk.

15. A system for backing up changed sectors of a virtual disk, the system comprising:
a computing device;
a backup application running on the computing device;
a virtual machine operating system that manages a virtual machine;
a file tracker driver that detects changes on a virtual machine disk associated with the virtual machine;
a virtual machine disk file that includes data associated with the virtual machine disk;
a record of changed file regions in the virtual machine disk file, the changed file regions being file regions in the virtual machine disk file that changed since a last backup; and
a block allocation table that translates a virtual machine disk offset of the virtual machine disk to a virtual machine disk file offset of the virtual machine disk file, the block allocation table including one or more records that reference one or more blocks of the virtual machine disk with data and metadata associated with the block, wherein backup application backs up one or more changed blocks of virtual machine disk.

* * * * *